April 16, 1968  R. ANDREWS  3,378,034
SINGLE CONTROL MIXING FAUCET
Filed Sept. 1, 1965  2 Sheets-Sheet 2
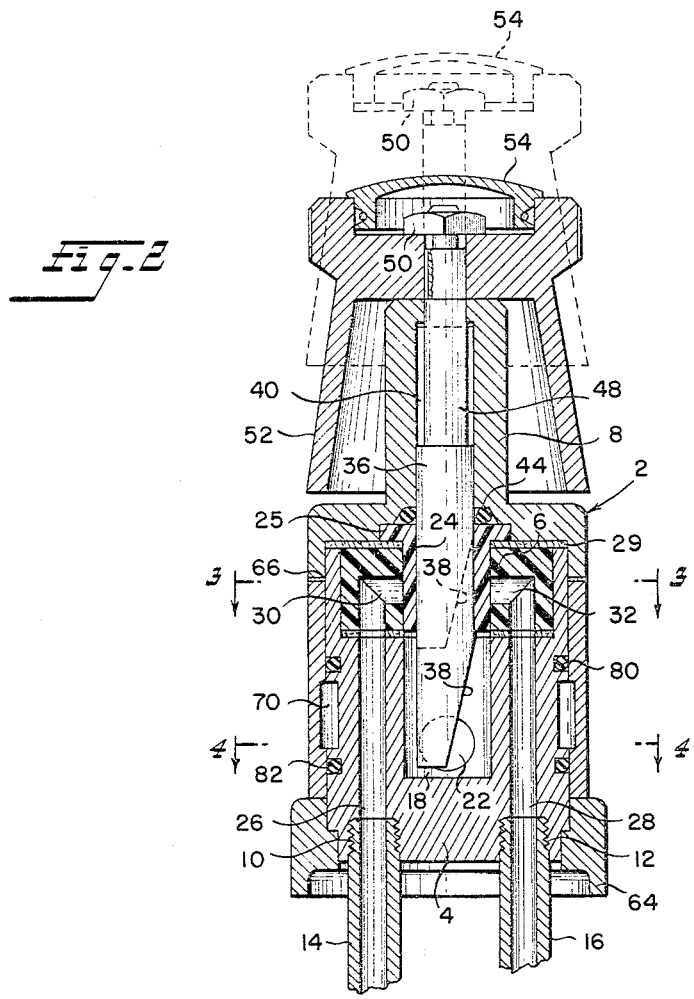
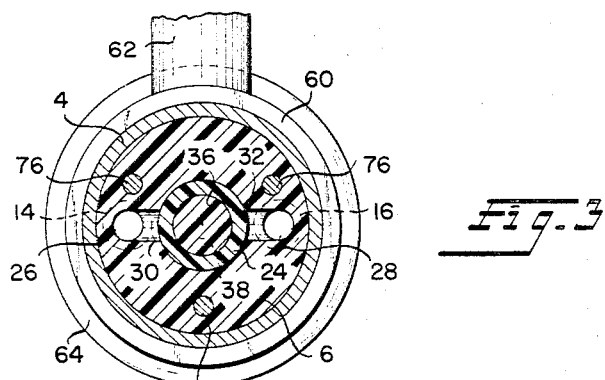
INVENTOR
*Roy Andrews*
BY *Griesbauer & Laubscher*
ATTORNEYS

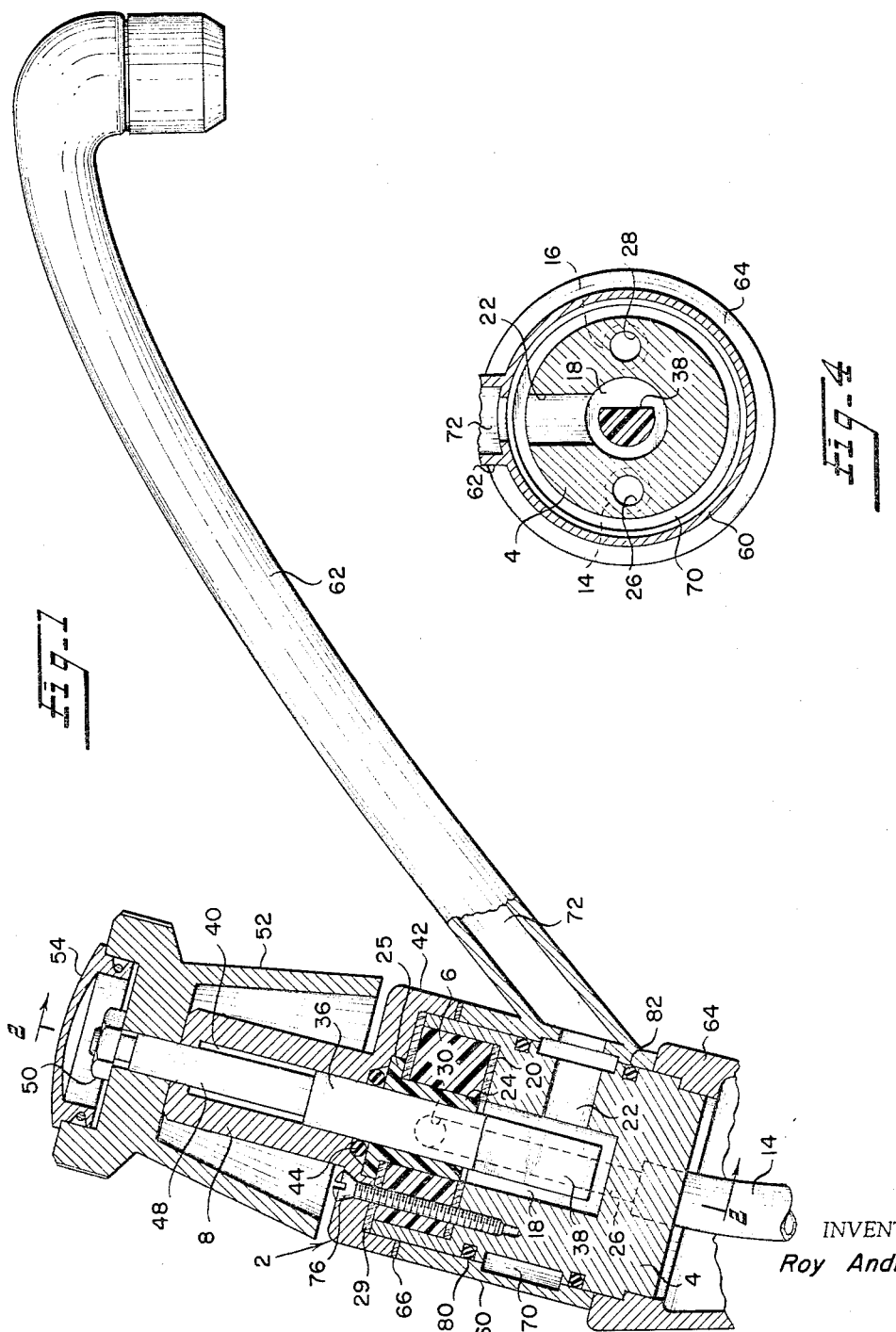

United States Patent Office 3,378,034
Patented Apr. 16, 1968

3,378,034
SINGLE CONTROL MIXING FAUCET
Roy Andrews, Zanesville, Ohio, assignor to National
Heating & Cooling Mfg. Corporation, Columbus,
Ohio, a corporation of Delaware
Filed Sept. 1, 1965, Ser. No. 484,368
9 Claims. (Cl. 137—625.4)

ABSTRACT OF THE DISCLOSURE

A mixing valve of the type including a flexible tubular valve member, and a cam rod axially and rotatably movable within said tubular valve member for accurately controlling the volume and temperature of water dispensed from a single faucet spout.

This invention relates generally to a single control hot and cold water mixing faucet, and more particularly to a single control mixing faucet including an open-ended flexible tubular member operable by an axially shiftable and rotatable cam rod for accurately controlling the volume and temperature of water dispensed from a single faucet spout.

Single control mixing faucets per se are well known in the prior art. In addition to being of relatively expensive and complex construction, the known mixing faucets are generally subject to corrosion and wear and consequently require frequent maintenance and repair. Furthermore, owing to their complex constructions, the known mixing devices are quite difficult to disassemble and assemble and often are subject, upon reassembly, to leakage between the housing sections. The present invention was developed to provide an improved mixing faucet of simple, durable inexpensive construction that avoids the above and other drawbacks of the known devices.

Accordingly, the primary object of the present invention is to provide a mixing valve including an open-ended flexible tubular member in which is mounted an axially shiftable and rotatable cam rod for controlling the communication between hot and cold water supply passages and a mixing chamber in constant communication with a faucet spout. The flexible tubular member is mounted in the bore of an annular synthetic plastic body section including hot and cold passageways having ports in the wall surface of the central bore contained therein. The cam rod includes a cylindrical portion that is dimensioned to force the flexible tubular member radially outwardly in sealing engagement with the bore wall, thereby isolating the hot and cold water supply passageways from the mixing chamber. The cam rod also includes a beveled end portion carrying a reduced or tapered surface for controlling the volume of fluid discharged through the faucet. When the cam rod is axially shifted to position the tapered surface opposite a hot or cold water port, the fluid pressure causes the open-ended flexible member to flex inwardly, thereby permitting communication between the port and the mixing chamber. When the cam rod is rotated through 180°, the first port is closed and the other port is opened. When the cam is rotated to an intermediate position, both ports are opened in accordance with the angular position of the cam rod. Consequently, the temperature of the mixed fluid is a function of the angular position of the cam rod, and the volume of fluid discharged is a function of the axial position of the cam rod.

A further object of the invention is to provide apparatus of the type described above wherein the cam rod and the annular body section are formed of a frictionless synthetic plastic material, whereby corrosion and wear of the faucet components are avoided.

Still another object of the invention is to provide apparatus of the type described above wherein the faucet body consists of a plurality of axially separable sections rigidly connected together by a plurality of longitudinal screws. The apparatus is so designed that by merely tightening the screws, the components are axially brought together to compress annular gasket means arranged therebetween, whereby leakage of the faucet is avoided. In the preferred embodiment, straight line compression of the gaskets and other compressible components is achieved merely by the use of three screws arranged at angles of 120° relative to the axis of the faucet body.

Other objects and advantages of the invention will become apparent from a study of the following specification when considered in conjunction with the accompanying drawing, in which:

FIGURE 1 is a partially sectioned side elevation view of the single control mixing faucet;

FIGURE 2 is a sectional view taken along line 2—2 of FIGURE 1; and

FIGURES 3 and 4 are sectional views taken along lines 3—3 and 4—4 of FIGURE 2, respectively.

Referring now to the drawing, the faucet assembly includes a rigid body 2 consisting of a first cylindrical section 4, an annular second section 6 molded from a synthetic plastic material, and a bonnet section 8. More particularly, the cylindrical body section, which is normally formed of metal, contains at one end a pair of inlet openings 10 and 12 that are connected with hot and cold water supply conduits 14 and 16, respectively. At its other end, the cylindrical section contains a circular bore coaxially receiving the annular second section 6, and a counterbore defining one end wall and the side wall of a mixing chamber 18. Annular gasket 20 is seated between the bottom of the axial bore and the annular second section 6. Outlet passage 22 contained in the cylindrical section 4 extends radially outwardly from the mixing chamber 18.

Mounted coaxially within the central bore of second section 6 is a flexible tubular member 24 having at one end a flange 25 seated upon an annular gasket 29 contiguous with the coplanar end surfaces of the body sections 4 and 6. As shown in FIGURE 2, the tubular member 24, which is preferably formed of a resilient material such as rubber, is adapted to close a pair of passages that afford communication between the inlet openings 10 and 12 and the mixing chamber 18. These passages consist of, respectively, a pair of longitudinal passageways 26 and 28 extending through cylindrical section 4, corresponding aligned openings contained in gasket 20, and a pair of right-angled passageways 30 and 32 contained in the second section 6. Each of the last-named passageways includes a longitudinal portion communicating with a radially-inwardly directed portion as shown in FIGURE 2.

Mounted for rotational and axial sliding movement in the flexible tubular member 24 is a cam rod 36 having a cylindrical body portion of a diameter to force the member 24 radially outwardly in tight sealing engagement with the adjacent wall surface of annular second section 6, thereby closing the ports of the hot and cold water passages leading to the mixing chamber 18. At its lower end, the cam rod extends through the open-ended tubular member 24 into the mixing chamber 18 and terminates in a beveled or chamferred end portion carrying a tapered (i.e., reduced) surface 38. At its upper end, the cam rod 36 is slidably and rotationally guided within a corresponding bore 40 contained within the bonnet 8.

The bonnet 8 includes an axially extending annular flange 42 that is mounted concentrically about the adjacent end of the cylindrical section 4, and an end surface which abuts the annular gasket 28 and which contains a circular recess receiving the annular flange 26 of flexible tubular member 24. An O-ring 44 mounted concentrically about the cylindrical portion of cam rod 36 is compressed between a corresponding recessed surface in bonnet 8 and the flanged end surface of flexible tubular member 24.

Cam rod 36, which is preferably formed of a smooth, frictionless synthetic plastic material (such as Celcon, produced by the Celonese Corporation of America, or Delrin, produced by Du Pont) includes an axial extension of reduced diameter 48 that is formed of metal or a rigid plastic material and extends through a corresponding opening contained within bonnet 8. Rigidly secured by nut 50 to the free extremity of cam rod extension 48 is a handle knob 52. If desired, key and slot or corresponding fluted surface connections may be provided to prevent rotational movement of the handle knob 52 relative to cam rod 36. Name plate cover button 54 is removably mounted within a corresponding bore contained in the upper end of handle knob 52 above the nut 50.

Mounted for rotation about the cylindrical body section 4 is the tubular hub portion 60 of a dispensing faucet spout 62. At its lower end the hub 60 is supported by the faucet base 64. At its upper end, hub 60 engages an annular gasket 66 that is mounted in contiguous engagement with the lower surface of the annular flange 42 of bonnet 8. The inner and outer peripheries of hub 60 and cylindrical body section 4 contain opposed circular recesses defining an annular chamber 70 that affords continuous communication between outlet 22 and the spout conduit 72, as shown in FIGURE 1.

In accordance with an important feature of the invention, the axially-separable cylindrical, annular and bonnet sections 4, 6 and 8, respectively, of the body 2 are rigidly connected by three screws 76 (FIGURES 1 and 3) that extend longitudinally downwardly through the bonnet and second and terminate in threaded bore contained in cylindrical body section 4.

*Operation*

When the mixing faucet is in the illustrated condition, the discharge ports of the hot and cold water supply passages are isolated from the mixing chamber 18 by the seating engagement of flexible tubular member 24 with the cylindrical wall surface of the central bore of annular member 6 (as caused by the cylindrical portion of cam rod 36). At this time, no fluid is discharged from the faucet spout 62.

Referring now to FIGURE 2, assume that the handle knob 52 is vertically lifted to raise cam rod 36 relative to tubular member 24 and the valve body 2. As the tapered surface 38 on the lower end of the cam rod is elevated to a position opposite the discharge port of cold water passageway 32, the tubular portion is flexed radially inwardly to afford communication between passageway 32 and mixing chamber 18. Cold water now flows from conduit 16 to faucet spout 62 via passageway 28, the opening in gasket 20, passageway 32, mixing chamber 18, outlet 22 and annular chamber 70. The volume of cold water discharged from spout 62 progressively increases as the cam rod is lifted to uppermost position illustrated in phantom. The uppermost extent of travel of the cam rod is limited by the cooperation between the shoulder at the upper end of the cam rod and the transverse upper portion of the bonnet 8. During this vertical movement of the cam rod, the hot water supply passage is maintained closed by the curved surface of the cam rod diametrically opposite the tapered surface 38.

Assume now that the cam rod has been elevated to a position intermediate the positions illustrated by the solid and phantom lines in FIGURE 2, and that the cam rod is rotated (by handle knob 52) about its axis through an angle of 180°. The cold water supply passage is closed by the curved peripheral surface diametrically opposite the tapered surface 38, and the flexible tubular member 24 flexes inwardly against the tapered surface 38 to afford communication between passageway 30 and mixing chamber 18. Hot water is now supplied from conduit 14 to faucet spout 62 via passageway 26, the opening in gasket 20, passageway 30, mixing chamber 18, outlet 22 and annular chamber 70.

If the cam rod 36 is now rotated through an angle less than 180°, the tapered surface 38 permits communication between both passageways 30 and 32 and mixing chamber 18, whereupon the hot and cold water is mixed in chamber 18 and is dispensed from spout 62 via outlet 22 and annular chamber 70.

To disassemble the faucet apparatus for inspection or repair, the cover button and nut 50 are removed to permit removal of handle knob 52. Screws 76 are removed, whereupon bonnet 8, hub 60, second section 6, tubular member 24, and annular gaskets 29, 20 and 66 are axially removable from the cylindrical section 4. Upon reassembly of the body 2, the screws 76 are tightened to compress the elements on the respective gaskets to seal the body against leakage. Further sealing is afforded by O-ring 44 and a pair of O-rings 80 and 82 mounted in axially spaced circular grooves contained in the outer periphery of cylindrical section 4 on opposite sides of the outlet 22.

Since the cam rod 36 and annular section 6 are molded synthetic plastic components, they are not subject to corrosion and wear, are more easily manufactured, and the shapes and tolerances are more easily held. The faucet apparatus is consequently of a simple, durable construction requiring a minimum number of parts. Owing to the cooperation between the cam rod and the open-ended tubular member, the volume and temperature of the dispensed water may be accurately controlled by the single operating means 52.

While in accordance with the provisions of the patent statutes, the preferred form and embodiment of the invention has been illustrated and described, it will be apparent to those skilled in the art that changes may be made in the apparatus described without deviating from the invention set forth in the following claims.

What is claimed is:

1. In a single control mixing faucet, the invention which comprises a rigid body including wall means defining a mixing chamber, said wall means containing a cylindrical bore comunicating at one end with said chamber, said body containing also an outlet opening in continuous communication with said mixing chamber, a pair of inlet openings, and a pair of passages affording communication between said inlet openings and a pair of passage openings contained in the cylindrical wall portion of said bore, respectively;

a flexible tubular member mounted coaxially in said bore for closing said passage openings, said tubular member being open at each end;

a cam rod mounted coaxially within said flexible tubular member and adapted to extend at each end therebeyond, said cam rod being mounted for axial sliding movement relative to said bore and including a cylindrical first portion operable to force said tubular member radially outwardly into peripheral sealing engagement with the cylindrical bore wall to close both of said passage openings when said cam rod has a first axial position relative to said bore, said cam rod including also a second beveled end portion axially spaced from said cylindrical first portion and contained within said mixing chamber when said cam rod is in said first position, said second portion containing in its outer periphery a reduced surface of such a configuration that when said cam rod is shifted axially relative to said body to a second position in which said second cam rod portion is contained within said bore, said tubular member is radially collapsed upon said reduced portion to afford communication between at least one of said passage openings and said mixing chamber, said cam rod also being rotatable, when in said second axially displaced position, between third and fourth positions in which said passage openings are in sole communication with said mixing chamber, respectively, and a fifth position in which both of said passage openings are in communication with said mxing chamber; and control means external of said body for axially and rotatably shifting said cam rod between said first, second, third, fourth and fifth positions.

2. Apparatus as defined in claim 1, wherein said body comprises a plurality of separable sections a first one of which comprises a cylindrical section containing at one end said pair of inlet openings, said first section containing at its other end an axial bore and an axial counterbore, said counterbore defining one end wall and the side wall of said mixing chamber, said first section containing also a first pair of longitudinal passageways defining portions of said longitudinal passages, respectively, said passageways communicating at opposite ends with said inlet openings and said axial bore, respectively.

3. Apparatus as defined in claim 2 wherein said body includes an annular second section mounted coaxially within the axial bore of said first section, said flexible member being mounted coaxially within the central opening of said annular second section, the wall of said central opening containing said pair of passage openings, said second section containing also a pair of second generally right-angled passageways affording communication between said pair of passage openings and the first passageways contained in said first section, respectively.

4. Apparatus as defined in claim 3 wherein said second body section is formed of a synthetic plastic material.

5. Apparatus as defined in claim 3 wherein said flexible member includes an annular flange seated upon the end surface of said second section remote from said first section.

6. Apparatus as defined in claim 5, and further wherein said body includes a bonnet section including at one end an annular flange mounted concentrically about the counterbored end of said first section, and an end surface seated upon the annular flange of said flexible member, and further including screw means rigidly connecting together said first, second and bonnet sections, said screw means comprising a plurality of screws extending longitudinally through said bonnet and second sections and terminating at their ends in threaded engagement with threaded bores contained in the axial bore portion of said first section.

7. Apparatus as defined in claim 6 wherein said bonnet section includes a central opening, wherein said cam rod includes an axial extension extending through said bonnet opening, and further wherein said control means comprises handle means rigidly secured to the free extremity of said axial extension.

8. Apparatus as defined in claim 6, wherein said mixing chamber outlet opening extends radially through the first body section, and further including faucet means mounted for rotation on said first section about and in continuous communication with said outlet opening.

9. Apparatus as defined in claim 4 wherein at least the cylindrical and beveled portions of said cam rod are formed of a synthetic plastic material.

References Cited

UNITED STATES PATENTS 3,297,051   1/1967   Church et al. _____ 137—625.17

M. CARY NELSON, *Primary Examiner.*

M. O. STURM, *Assistant Examiner.*